US012764360B2

(12) United States Patent
Frantz et al.

(10) Patent No.: US 12,764,360 B2
(45) Date of Patent: *Oct. 13, 2026

(54) SYSTEMS AND METHODS FOR PROVIDING VARIABLE SPEEDS IN A TRICK-PLAY MODE

(71) Applicant: DIVX, LLC, San Diego, CA (US)

(72) Inventors: William Frantz, San Diego, CA (US); Eric William Grab, San Diego, CA (US); Cristina Dobrin, San Diego, CA (US)

(73) Assignee: DIVX, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/235,477

(22) Filed: Jun. 11, 2025

(65) Prior Publication Data

US 2025/0310582 A1 Oct. 2, 2025

Related U.S. Application Data

(63) Continuation of application No. 18/433,109, filed on Feb. 5, 2024, now Pat. No. 12,356,029, which is a (Continued)

(51) Int. Cl.

| | |
|---|---|
| ***H04N 21/2387*** | (2011.01) |
| ***G11B 27/10*** | (2006.01) |
| ***H04N 21/242*** | (2011.01) |
| ***H04N 21/43*** | (2011.01) |
| ***H04N 21/431*** | (2011.01) |
| ***H04N 21/44*** | (2011.01) |
| ***H04N 21/61*** | (2011.01) |

(Continued)

(52) U.S. Cl.

CPC ......... *H04N 21/2387* (2013.01); *G11B 27/10* (2013.01); *H04N 21/242* (2013.01); *H04N 21/4302* (2013.01); *H04N 21/4312* (2013.01); *H04N 21/44004* (2013.01); *H04N 21/6125* (2013.01); *H04N 21/6587* (2013.01); *H04N 21/8455* (2013.01); *H04N 21/8456* (2013.01)

(58) Field of Classification Search

None

See application file for complete search history.

(56) References Cited

U.S. PATENT DOCUMENTS 10,904,594 B2 * 1/2021 Frantz ................ H04N 21/6125
11,895,348 B2 * 2/2024 Frantz ............. H04N 21/44004

(Continued)

*Primary Examiner* — Junior O Mendoza
(74) *Attorney, Agent, or Firm* — KPPB LLP

(57) ABSTRACT

Systems and methods for providing variable trick-play mode playback of media content in accordance with embodiments of the invention are disclosed. A playback device stores images of the media content associated with presentation times and marker information for the media content that indicates the presentation time of moments of interest. When a trick-play mode is invoked, the playback device determines a presentation time of a next marker in the playback. The playback device determines whether the current presentation time of the playback is within a specified range of the presentation time of the next marker and adjusts the speed of the trick-play playback based on the determination. The next frame to present is determined based on the adjusted speed of the trick-play playback and displayed.

17 Claims, 8 Drawing Sheets

Related U.S. Application Data continuation of application No. 17/154,935, filed on Jan. 21, 2021, now Pat. No. 11,895,348, which is a continuation of application No. 16/175,486, filed on Oct. 30, 2018, now Pat. No. 10,904,594, which is a continuation of application No. 15/163,333, filed on May 24, 2016, now Pat. No. 10,129,574.

(51) Int. Cl.

| | |
|---|---|
| ***H04N 21/6587*** | (2011.01) |
| ***H04N 21/845*** | (2011.01) |

(56) References Cited

U.S. PATENT DOCUMENTS

| | | | | |
|---|---|---|---|---|
| 12,356,029 | B2 * | 7/2025 | Frantz | H04N 21/4302 |
| 2010/0303440 | A1 * | 12/2010 | Lin | H04N 21/4828<br>725/118 |
| 2015/0350700 | A1 | 12/2015 | Pantos | |
| 2017/0257410 | A1 | 9/2017 | Gattis et al. | |
| 2021/0144417 | A1 | 5/2021 | Frantz et al. | |
| 2024/0364949 | A1 | 10/2024 | Frantz et al. | |
| 2025/0310582 | A1 * | 10/2025 | Frantz | H04N 21/8456 |

* cited by examiner

SYSTEMS AND METHODS FOR PROVIDING VARIABLE SPEEDS IN A TRICK-PLAY MODE

CROSS REFERENCE TO RELATED APPLICATIONS

The current application is a continuation of U.S. patent application Ser. No. 18/433,109, filed Feb. 5, 2024, entitled "Systems and Methods for Providing Variable Speeds in a Trick-Play Mode" to Frantz et al., and published on Oct. 31, 2024 as U.S. 2024-0364949, which is a continuation of U.S. patent application Ser. No. 17/154,935, filed Jan. 21, 2021, entitled "Systems and Methods for Providing Variable Speeds in a Trick-Play Mode" to Frantz et al. and issued on Feb. 6, 2024 as U.S. Pat. No. 11,895,348, which is a continuation of U.S. patent application Ser. No. 16/175,486, filed Oct. 30, 2018, entitled "Systems and Methods for Providing Variable Speeds in a Trick-Play Mode" to Frantz et al. and issued on Jan. 26, 2021 as U.S. Pat. No. 10,904, 594, which is a continuation of U.S. patent application Ser. No. 15/163,333, filed May 24, 2016, entitled "Systems and Methods for Providing Variable Speeds in a Trick-Play Mode" to Frantz et al. and issued on Nov. 13, 2018 as U.S. Pat. No. 10,129,574, the disclosures of which are expressly incorporated by reference herein in their entirety.

FIELD OF THE INVENTION

The present invention generally relates to adaptive streaming and more specifically to streaming systems that may provide variable speeds of playback during a trick-play mode based upon marked presentation times.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Washington, and Flash Dynamic Streaming developed by Adobe Systems Incorporated of San Jose, California. HTTP Adaptive Bitrate Streaming developed by Apple Computer Incorporated of Cupertino, California implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, California utilizes an extension of the Matroska container format (i.e. is based upon the Matroska container format, but includes elements that are not specified within the Matroska format standard).

To provide a consistent means for the delivery of media content over the Internet, the International Organization for Standardization (ISO) and the International Electrotechnical Commission (IEC) have put forth the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

As the speed at which streaming content has improved. Streaming of live events, such as sporting events and concerts has become popular. This type of content often has moments of interest at certain times during the presentation. For example, scoring plays during a sporting event may be of interest to viewers. As such, users may want to search for a particular moment using a trick-play mode such as fast forward or rewind. Often the user is not concerned with other portions of the content that may not include the moment of interest. Most conventional playback systems only provide the trick-play modes at one speed or at a set of predefined different speeds. These systems require the user to manually control the speed of the trick-play mode playback while scanning through the media content. Thus, the user may miss an interesting moment if the user does not know the presentation time for the moment and/or the user must change the speed of playback as the presentation time of the moment of interest approaches during playback to find a good starting point for normal playback of the moment of interest. As such, users would prefer a system that indicates when a moment of interest is about to be encountered during playback in a trick-play mode to find a proper starting point for normal playback.

SUMMARY OF THE INVENTION

Systems and methods for providing variable speed trick-play playback in accordance with some embodiments of the invention are disclosed. In accordance with some embodiments of the invention, a process for to provide variable speed trick-play playback is performed by a playback device in the following manner. The playback device stores a frames of a video content portion of media content and marker information for the video content in a buffer. The marker information indicates a presentation time for each of one or more moments of interest in the media content. The playback device receives a command for playback of the media content in a trick-play mode. The playback device reads a presentation time of a next marker from the marker information and determines a playback speed for the trick-play mode based upon the marker information and a current presentation time using the playback device. The next frame to present from the video content is determined upon the determined playback speed and the current frame being presented using the playback device. The next frame is obtained from the buffer in the playback device and presented.

In accordance with some embodiments, the determining of the playback speed includes determining whether the current presentation time is within a certain range of the presentation time of the next marker. In accordance with some of these embodiments, the playback speed of the trick-play is decremented in response to being within the certain range of the presentation time of the next marker. In accordance with many embodiments, the playback speed of the trick-play is incremented in response to being outside the certain range of the presentation time of the next marker.

In accordance with some embodiments, the determining of the playback speed includes determining whether the current presentation time is within one of multiple of ranges from the presentation time of the next marker. The playback speed is adjusting the playback speed for the trick-play based upon which one of the plurality of ranges current presentation time is determined to be within. In accordance with some other embodiments, the determining of the playback speed includes setting the next presentation time to be the presentation time of the marker and using a frame associated with the presentation time as the next frame.

In accordance with a number of embodiments, the process further includes generating a display of a scrubber indicating the next presentation time and overlaying the display of the scrubber over the presentation of the image on the display.

In accordance with many of the embodiments, the marker information is obtained using adaptive bitrate streaming.

DETAILED DISCLOSURE OF THE INVENTION

Figure 1:
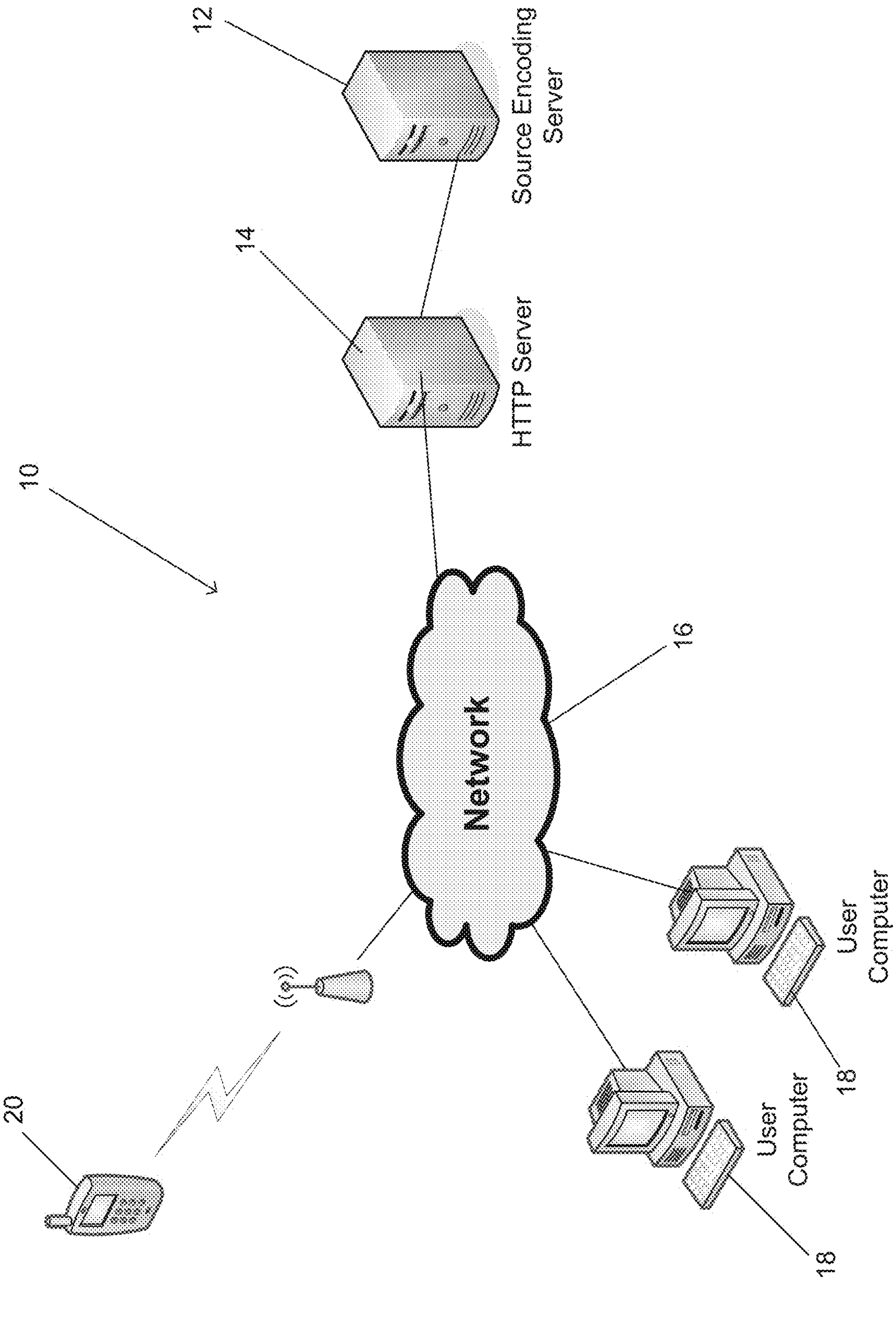
FIG. 1 illustrates a network diagram of an adaptive bitrate streaming system in accordance with an embodiment of the invention.

Turning now to the drawings, systems and methods for providing variable speed trick-play modes during playback in accordance with some embodiments of the invention are illustrated. For purposes of this discussion, a trick-play mode is a mode in which video data is presented in manner other than the sequential presentation of video content in accordance with an intended presentation time. In this context, presentation time may be encoded with respect to each frame of video, video segment and/or audio segment. Playback in trick-play mode involves playing frames and/or audio samples with a sequence and timing that does not reflect the intervals between the presentation times accompanying the frames and/or audio samples in the encoded media. Examples of trick-play modes include, but are not limited to, rewind, fast forward, forward seek and rewind seek. In accordance with some embodiments, a trick-play mode is initiated by the playback device receiving a command from a user indicating a particular trick-play mode. The playback device then begins trick-play mode playback. The playback device reads marker information from a memory storing the marker information. The current presentation time of playback is then used with the marker information to determine the speed of playback for the trick-play mode. In accordance with some embodiments, the playback speed is incremented if the current presentation time is not within a specified length of time from the presentation time of the next marker in the list. In accordance with many embodiments, the playback time is decremented if the current presentation time is within the specified length of time from the next marker. In a number of embodiments, the system may move from the current presentation time to the presentation time of the marker without presenting intermittent content.

Based on the determined speed of playback, the next frame to be presented is determined, In accordance with some of these embodiments, the next frame is determined by determining presentation time to be displayed. The media content associated with the determined presentation time read from a buffer storing the frame of the stream. In accordance with some embodiments, an image of a scrubber indicating the determined presentation time of the media content is generated. In accordance with some of these embodiments, the generated scrubber indicates the determined presentation time compared to the total presentation time of the media content. The image is displayed in accordance with some embodiments and in accordance with many embodiments the generated image of the scrubber is overlaid on the presentation of the image.

In accordance with some embodiments, marker information indicating the moments of interest in the media content is generated by an encoding device. In accordance with some these embodiments, the marker information is stored as metadata in files storing the media content. In accordance with some other embodiments, the marker information is stored in an index file associated with the media content. In accordance with still other embodiments, the marker information is stored in a top level index file or manifest file.

The marker information associates a presentation time with a moment of interest in the media content. In accordance with some embodiments, the marker information may include significant moments in the media content. For example, in some embodiments where the media content is a sporting event, the marker may indicate a scoring play; a significant play such as a steal, catch, pass, or kick; and/or a stoppage in play. In accordance with some other embodiments, the marker information may indicate a presentation time in which the odds of a particular team/participant winning and/or scoring reach a specified percentage. In accordance with still some other embodiments, the marker information may indicate a time remaining of a game clock for the sporting event and/or stoppages of the game clock. In accordance with some embodiments, the marker information may include markers indicating a significant increase in social media activity where the increase of activity is often indicative of a moment of interest.

In accordance with some embodiments, a playback device that changes the speed of playback in a trick-play mode uses adaptive bit rate streaming to obtain the media content. In accordance with some embodiments, the media content is stored in streams in accordance with the DASH standards. However, one skilled in the art will recognize that the formats such as but not limited to, a Matroska (MKV) container file format may be used to store streams of the media content without departing from this invention.

The performance of an adaptive bitrate streaming system in accordance with some embodiments of the invention can be significantly enhanced by encoding each portion of the source video in each of the alternative streams stream at each bit rate in such a way that the portion of video is encoded in each stream as a single (or at least one) closed group of pictures (GOP) starting with an Instantaneous Decoder Refresh (IDR) frame, which is an intra frame. The playback device can switch between the alternative streams used during playback at the completion of the playback of a video segment and, irrespective of the stream from which a video segment is obtained, the first frame in the video segment will be an IDR frame that can be decoded without reference to any encoded media other than the encoded media contained within the video segment.

In a number of embodiments, the playback device obtains information concerning each of the available streams from the MPD and selects one or more streams to utilize in the playback of the media. The playback device can also request index information that indexes segments of the encoded media stored within the relevant container files. The index information can be stored within the container files or separately from the container files in the MPD or in separate index files. The index information enables the playback device to request byte ranges corresponding to segments of the media within the container file containing specific portions of encoded media via HTTP (or another appropriate stateful or stateless protocol) from the server. The playback device may obtain the marker information in the index information when the top level index file is received, request the files storing the markers information after the MPD file is received or request the portions of the container file storing the index information in accordance with various embodiments of the invention. The playback device uses the index information to request portions of the media content from the alternative streams in accordance with some embodiments. Playback is continued with the playback device requesting portions of the encoded content from a stream having media content that is encoded at a bitrate that can supported by the network conditions.

In accordance with some embodiments, the playback device may use the marker information to determine segments of the media content to pre-fetch before playback. As these the likelihood of the content being fetched than other portions of the media content. This may increase the speed of playback start-up and/or prevent errors due to missing segments. To do so, the playback device reads the marker information and determines the presentation time for each marker and the segment of the media content associated with each presentation time. The playback device then requests a predetermined number of segments before and/or after the identified segments. In accordance with a number of these embodiments, the playback device requests the segments from streams with different maximum bitrates, different resolutions, and/or other different parameters to minimize bandwidth use and/or support other playback functions.

The encoding of source media content for use in adaptive bitrate streaming systems that provide variable speed playback in trick-play modes using adaptive bitrate streaming in accordance with some embodiments of the invention is discussed further below.

Adaptive Streaming System Architecture

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates an MPD that includes an index indicating container files containing the streams and/or metadata information, at least a plurality of which are alternative streams. Alternative streams are streams that encode the same media content in different ways. In many instances, alternative streams encode media content (such as, but not limited to, video content and/or audio content) at different maximum bitrates. In a number of embodiments, the alternative streams of video content are encoded with different resolutions and/or at different frame rates. The MPD and the container files are uploaded to an HTTP server 14. A variety of playback devices can then use HTTP or another appropriate stateless protocol to request portions of the MPD, index files, and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, virtual reality headsets, augmented reality headsets and other devices that are capable of connecting to a server via a communication protocol including (but not limited to) HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
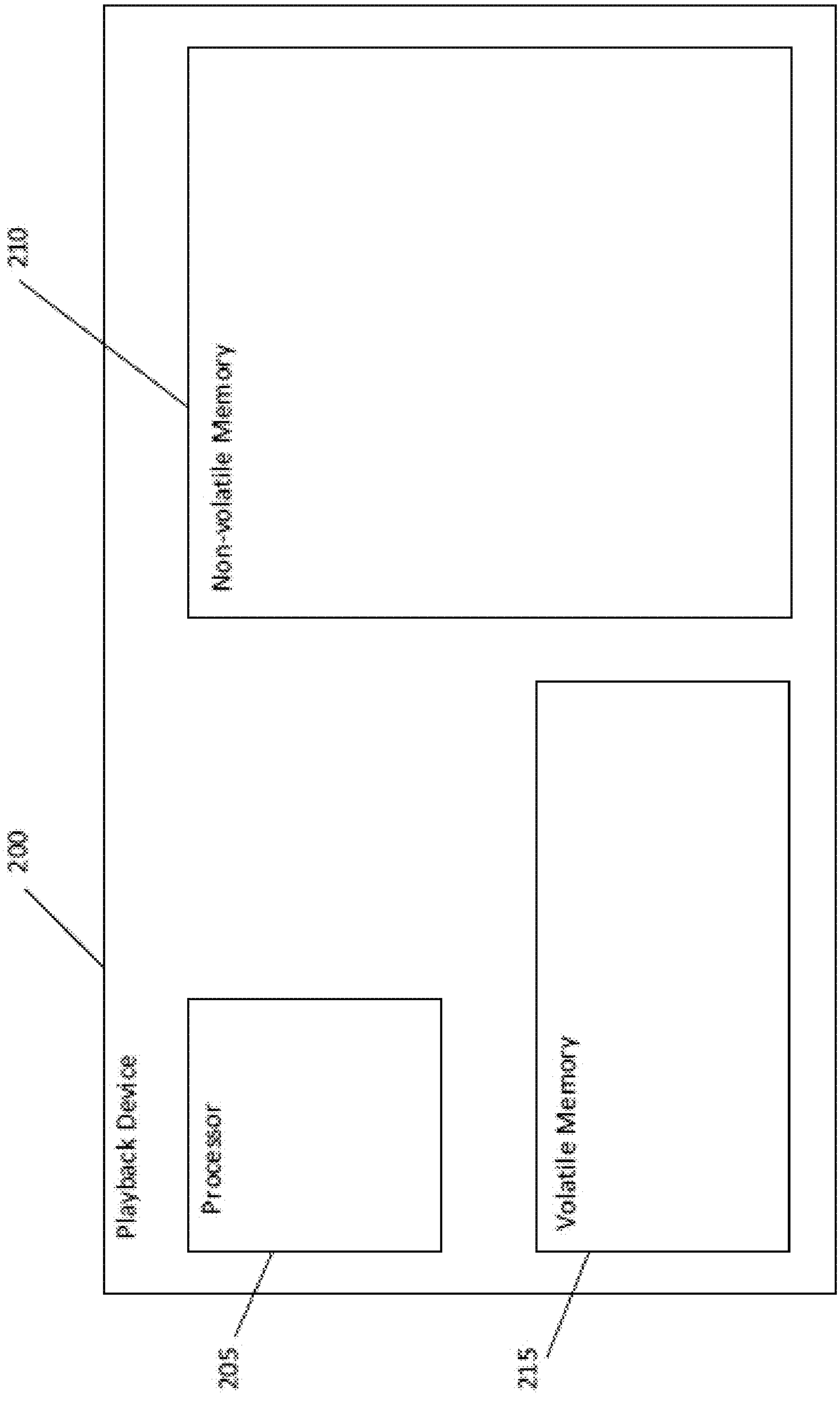
FIG. 2 illustrates a block diagram of components of a processing system in a playback device that provides variable speed playback in a trick-play mode in accordance with an embodiment of the invention.

Some processes for providing methods and systems in accordance with embodiments of this invention are executed by a playback device. The relevant components in a playback device that can perform the processes in accordance with an embodiment of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes for providing variable speed playback in a trick-play mode in accordance with some embodiments of the invention and/or data for the processes being utilized. In accordance with various other embodiments, the playback device software and/or firmware can include the instructions for providing can be stored in any of a variety of non-transitory computer readable media appropriate to a specific application.

Servers

Figure 3:
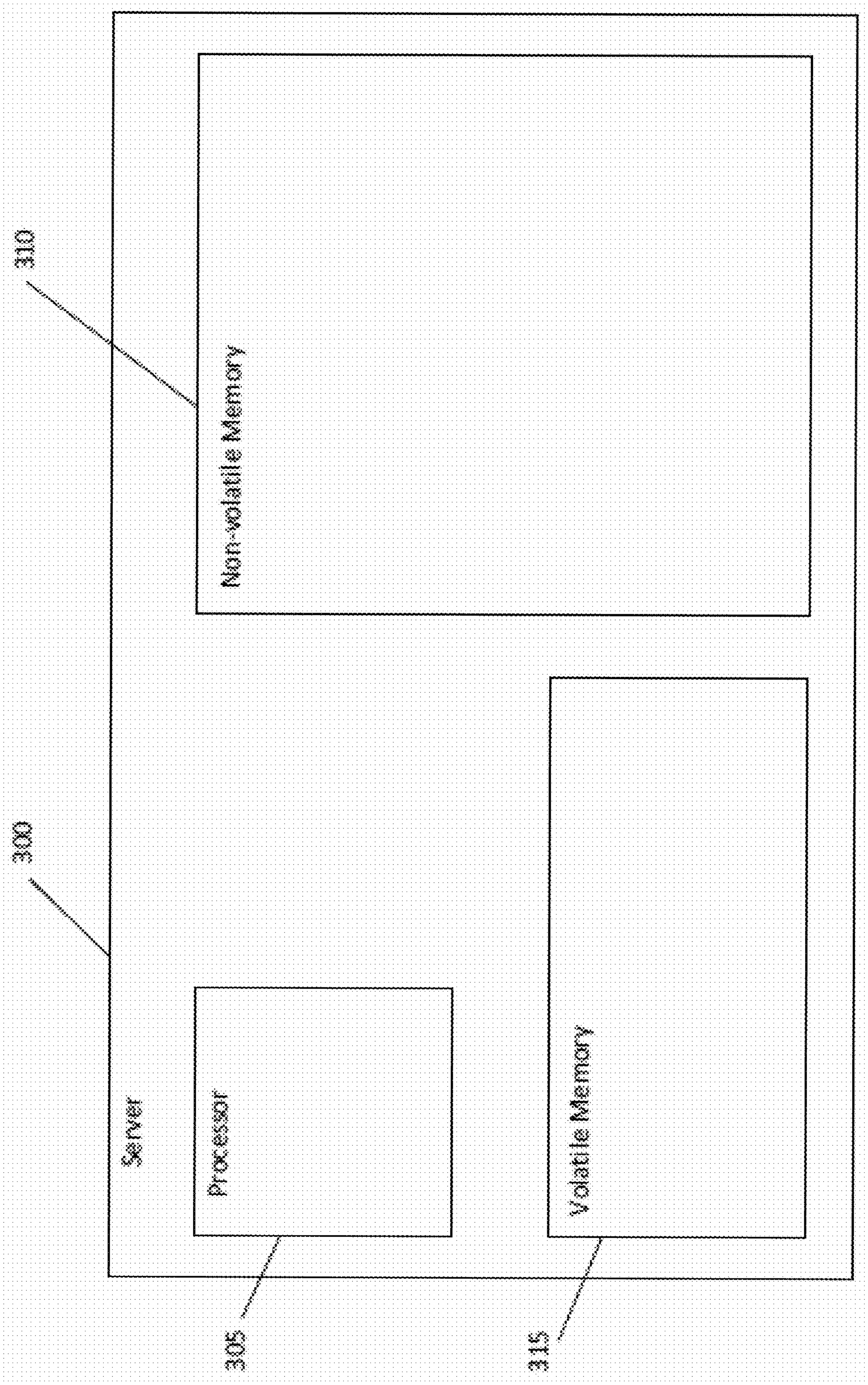
FIG. 3 illustrates a block diagram of components of a processing system such as a processing system in an encoding system, and/or content provider system that provides media content including marker information for using in providing variable speed playback in a trick-play mode in accordance with an embodiment of the invention.

Some processes for providing methods and systems in accordance with some embodiments of this invention are executed by the HTTP server; source encoding server; and/or local and network time servers. For example, the source encoding server encodes media content, such as a live feed of media content from an event, into multiple streams and/or generates the marker information; and the HTTP server provides the multiple streams and/or marker information to playback device in accordance with some embodiments. The relevant components in a server that perform the processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes for encoding media content and/or generating marker information in accordance with some embodiments of the invention and/or data for the processes being utilized. In accordance with various embodiments, these instructions may be in server software and/or firmware can be stored in any of a variety of non-transitory computer readable media appropriate to a specific application. Although a specific server is illustrated in FIG. 3, any of a variety of server configured to perform any number of processes can be utilized in accordance with embodiments of the invention.

Encoding of Streams of Media Content and Synchronization Information in Alternative Streams In accordance with some embodiments, an encoder system that provides media content that may be used by a playback system that provides variable speed trick-play playback receives: the media content including video content and audio content; and marker information for a content provider. To provide the required data to provide media content via adaptive bitrate streaming, the audio content and the video content can be encoded in streams and marker information can be generated and stored in a manner such that the information may be provided to the playback device. In accordance with some embodiments, the audio content is encoded in one stream at a specific maximum bitrate; and the video content is encoded into multiple streams that are encoded at varying maximum bitrates, resolutions, aspect ratios, and the like for use by different playback devices experiencing differing network traffic conditions. In accordance with some other embodiments, the audio content is encoded in multiple streams at varying maximum bitrates; and the video content is encoded into multiple streams that are encoded at varying maximum bitrates, resolutions, aspect ratios, and the like for use by different playback devices experiencing differing network traffic conditions. In a number of embodiments, the video content may also be encoded into trick-play streams that only include specific portions of the video content for use in providing trick-play modes during playback.

Figure 4:
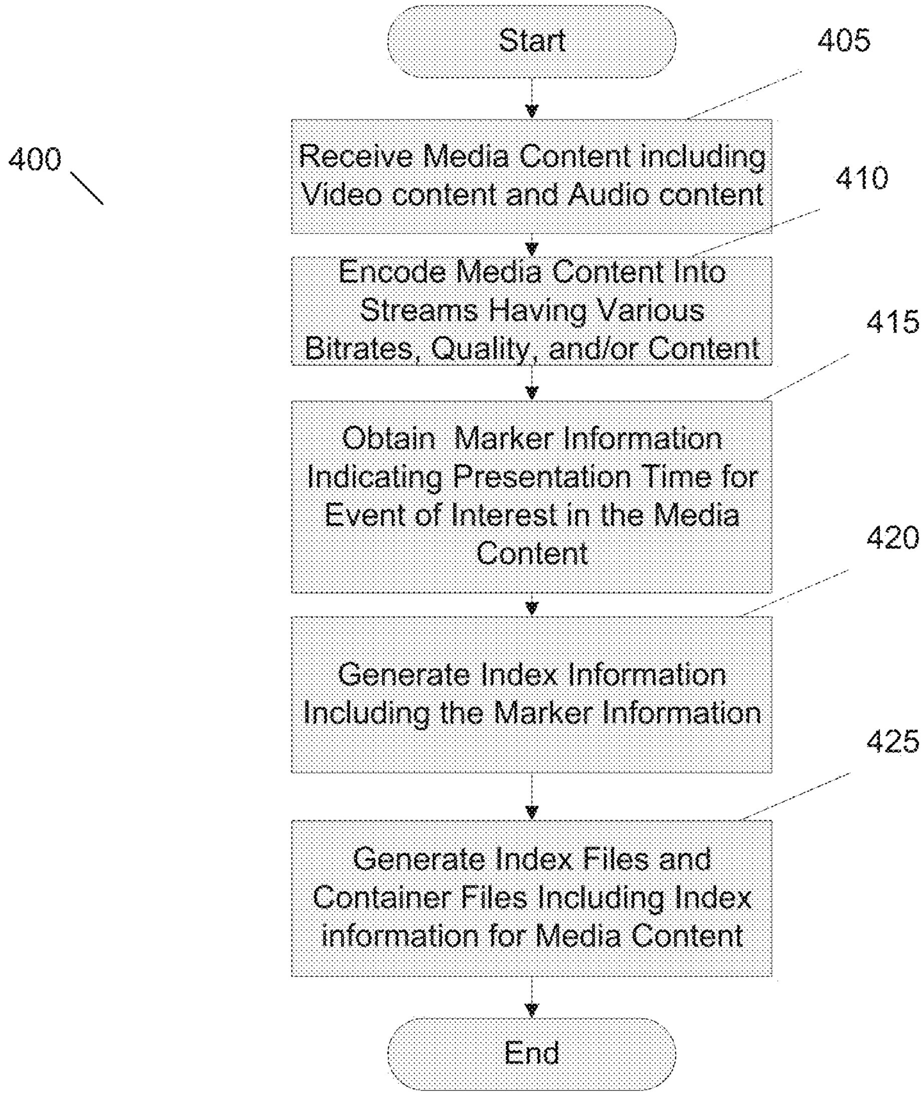
FIG. 4 illustrates a flow diagram of a process performed by an encoding system to encode streams of media content including at least one stream of audio data divided into segments and at least one stream of video content including frames and to generate marker information that indicates a moment of interest in accordance with an embodiment of the invention.

In accordance with some embodiments, the marker information is included in index information stored in a top level index file such as a MPD. In accordance with many embodiments, the marker information is stored in an index file pointed to by the top level index file. In a number of embodiments, the marker information may be stored as metadata in files storing portions of the streams of the media content including, but not limited to, audio content and/or video content. A process performed by an encoder server system for encoding media content including audio content and video content as well as marker information in accordance with an embodiment of this invention is shown in FIG. 4.

Process 400 begins by receiving media content to be encoded (405). The media content includes audio content and video content. In accordance with some embodiments of this invention, the audio content is divided into segments and the video content includes frames where each frame provides information for one or more of the images in the video content. The process 400 then encodes the audio content and video content into streams (410). In accordance with many embodiments, the audio content is encoded in one stream at a specific maximum bitrate; and the video content is encoded into multiple streams that are encoded at varying maximum bitrates, resolutions, aspect ratios, and the like for use by different playback devices of different configurations and experiencing differing network traffic conditions. In accordance with some other embodiments, the audio content is encoded in multiple streams at varying maximum bitrates; and the video content is encoded into multiple streams that are encoded at varying maximum bitrates, resolutions, aspect ratios, and the like for use by different playback devices experiencing differing network traffic conditions. In a number of embodiments, the video content may also be encoded into trick-play streams that only include specific portions of the video content for use in providing trick-play modes during playback.

Process 400 obtains marker information that indicates the presentation of moments of interest in the media content (415). The marker information indicates the presentation times of one or more moments of interest in the media content. In accordance with some embodiments, the marker information may include the presentation time of moments of interest in the media content. For example, in some embodiments where the media content is a sporting event, the marker may indicate a scoring play; a significant play such as a steal, catch, pass, or kick; and/or a stoppage in play. In accordance with some other embodiments, the marker information may indicate a presentation time in which the odds of a particular team/participant winning and/or scoring reach a specified percentage. In accordance with still some other embodiments, the marker information may indicate a time remaining of a game clock for the sporting event and/or stoppages of the game clock. In accordance with some embodiments, the marker information may include markers indicating a significant increase in social media activity where the increase of activity is often indicative of a moment of interest. In accordance with still some other embodiments, the markers may indicate presentation times marked at re-start points by various users where information about trick-play use is shared by the playback device with a content provider system that collects the information and generates markers for moments of interest from the information received from various playback devices.

In accordance with some embodiments, the marker information may be received along with the media content such as in a feed from a live event. In accordance with many embodiments, the marker information may be generated by encoder server system. For example, the encoder server system may be monitoring social media feeds and using an artificial intelligence algorithm to detect important events and generate the marker information for the events. In accordance with a number of embodiments, the marker information may be received as an input of an operator of the encoder server system. The marker is then encoded as index information for the media content (420).

The process 400 generates the container files and index files for the media content (425). In accordance with some embodiments, each stream (of both audio and video content) is divided into segments. In accordance with many embodiments, the index information is placed in the top level index file such as, but not limited to a MPD. In accordance with a number of embodiments, the index information is placed in one or more index files that are pointed to by the top level index file. In still some other embodiments, index information including the marker information is stored in container files as metadata. In some particular embodiments, the marker information for a particular portion of media content is stored as metadata in the container file storing the segments of the media content.

Although various examples of processes for encoding alternative streams of media content including audio content, video content, and synchronization information are described above, one skilled in the art will recognize that other processes for encoding the streams may be performed in accordance with some embodiments of the invention.

Figure 5:
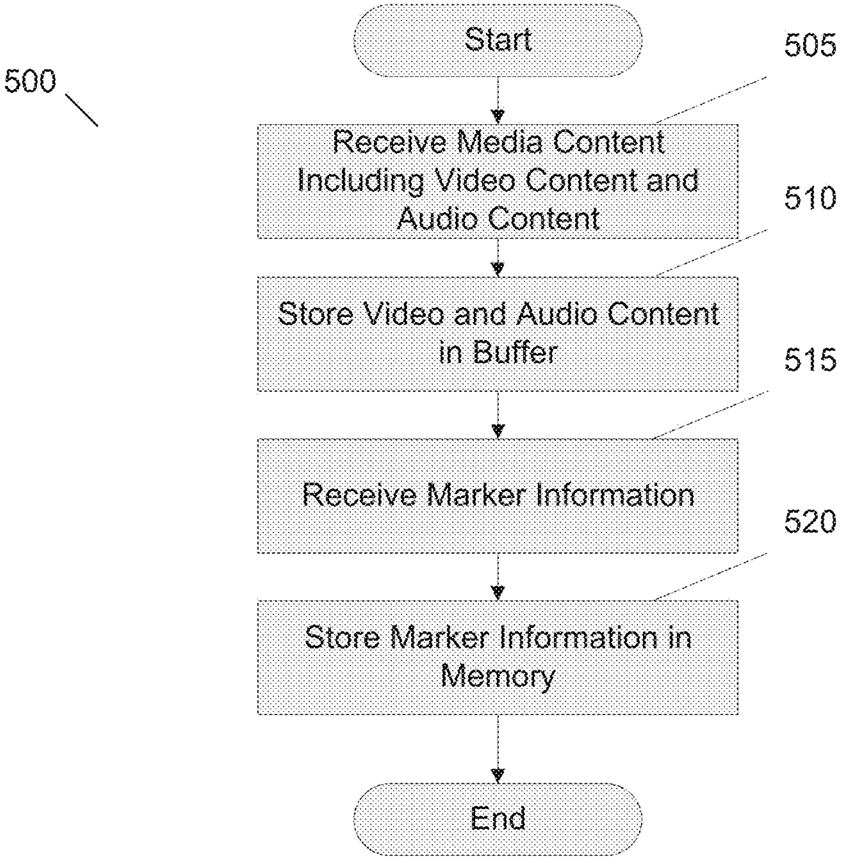
FIG. 5 illustrates a flow diagram of a process performed by a playback device to obtain media content as well as marker information for the media content in accordance with an embodiment of the invention.

Playback of Media Content Including Providing Audio Data in a Trick-Play Mode In accordance with some embodiments of the invention, a playback device provides variable speeds of trick-play playback. To do so, the playback device stores audio content, the video content, and marker information that provides presentation times for moments of interest. A process for obtaining the media content and marker information in accordance with an embodiment of this invention is shown in FIG. 5.

The process 500 receives the media content including audio content and video content (505). In accordance with some embodiments of the invention, the media content is received via adaptive bit rate streaming. In accordance with some other embodiments, the media content may be read from a memory. In accordance with still other embodiments, the media content is read from a non-transitory media storing the media content. The media content including video content and/or audio content are stored in a buffer for playback as the media content is decoded by the playback device (510).

Marker information is received (515) by process 500. The marker information provides the presentation time(s) of one or more moments of interest in the media content. In accordance with some embodiments, the marker information indicates the presentation times of a particular type or types of moments of interest. In accordance with some other embodiments, the marker information includes a type of moment and presentation time for each of the moments of interest. In accordance with still other embodiments, the marker information may include a presentation time, a type of moment and duration of the period of interest for each of the moments of interest. The received marker information is stored in a memory for use during play and more particularly for use during playback of audio content in a trick-play mode in accordance with some embodiments of this invention (520).

Although a process for obtaining media content and marker information for use in providing playback of audio content in a trick-play mode is discussed above with reference to FIG. 5, one skilled in the art will recognize that other processes for obtaining media content may be performed in accordance with various embodiments of this invention.

Figure 6:
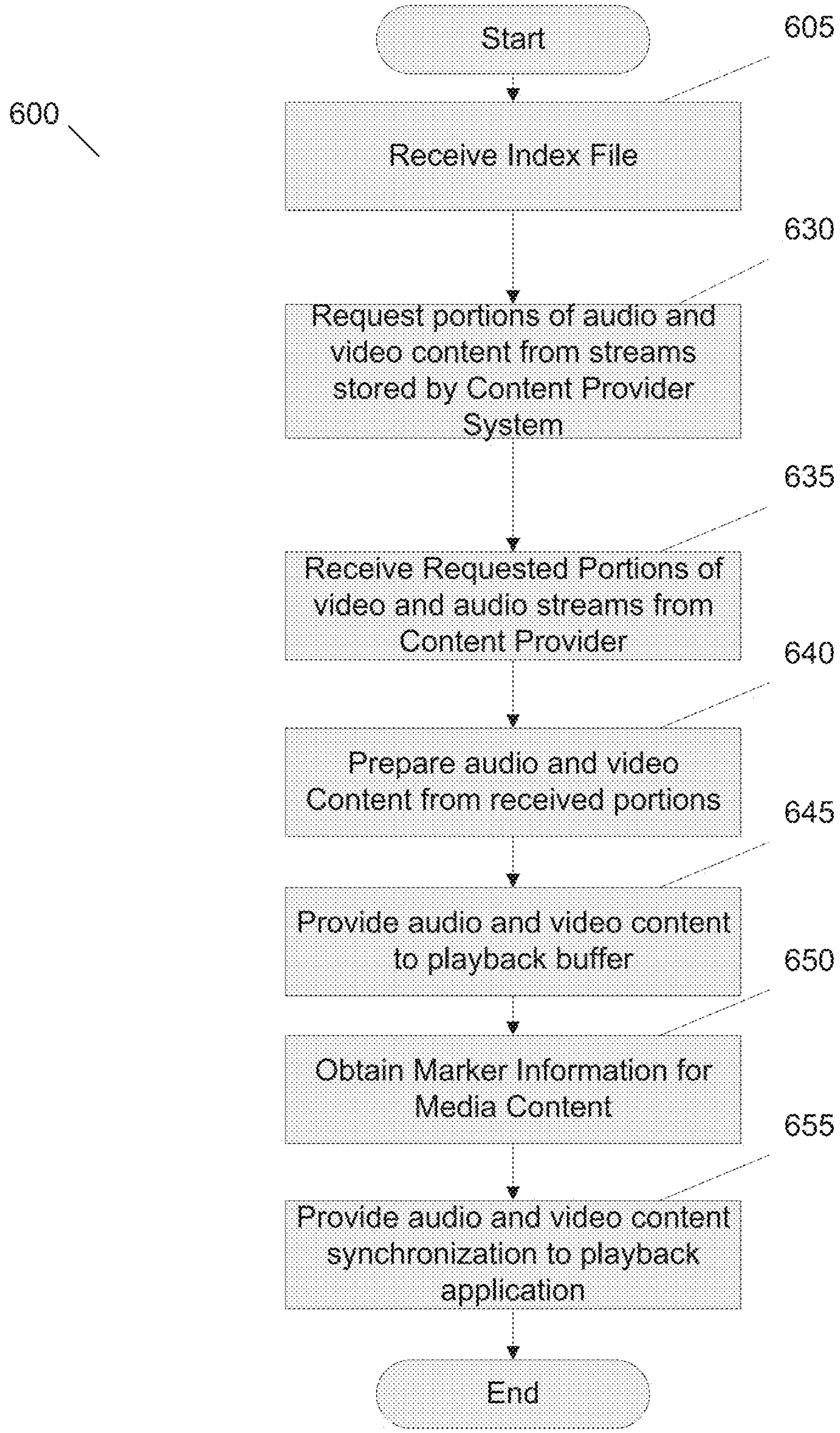
FIG. 6 illustrates a flow diagram for a process performed by a playback device to obtain media content as well as marker information for the media content using adaptive bitrate streaming in accordance with an embodiment of the invention.

In accordance with some particular embodiments of the invention, a playback device may obtain media content for use in providing variable speed trick-play playback of media content using adaptive bit rate streaming. A process for obtaining media content and marker information for use in providing variable speed trick-play playback in accordance with an embodiment of the invention is shown in FIG. 6.

In process 600, the playback device receives an index file from a content provider system (605). The playback device uses the index file to request portions of the media content including audio content and/or video content from content provider system (630). In accordance with some embodiments of the invention, the playback device monitors the network bandwidth for communications over the network between the playback device and the content provider system; and selects streams of the audio and/or video content that are encoded at highest maximum bitrates that can be handled in accordance with the measured bandwidth. Systems and methods for selecting a stream and commencing playback include those disclosed in U.S. Patent Application Publication 2013/0007200 entitled "Systems and Methods for Determining Available Bandwidth and Performing Initial Stream Selection When Commencing Streaming Using Hypertext Transfer Protocol" and U.S. Pat. No. 8,832,297 entitled "Systems and Methods for Performing Multiphase Adaptive Bitrate Streaming," the disclosures of which are hereby incorporated by reference in their entirety. More particularly, the processes performed by a playback device to obtain media content using adaptive bit rate streaming described in these references are incorporated herein by reference.

The requested portions of audio and/or video content(s) are received by the playback device (635). The audio and/or video content(s) are prepared from the received portions (640) by the playback device and are placed in a buffer in the playback device to store for presentation (645) by a client application. One skilled in the art will note that the requesting (630), receiving (635), generating (640) and providing of the audio and video content may be performed iteratively until all of the audio and video contents of the media content is received by the playback device in accordance with adaptive bitrate streaming processes.

The playback device also obtains the marker information that provides presentation times for moments of interest in the media content (650). In accordance with some embodiments, the marker information may be read from the top level index file when the top level index file is received system during an initial start-up of an adaptive bitrate streaming process. In accordance with some other embodiments, the playback device reads a pointer to an index file storing the marker information from the top level index file; and requests and receives the index file from content provider system during an initial start-up of an adaptive bitrate streaming process. In accordance with still other embodiments, the marker information is received as metadata during the streaming of the audio and/or video contents. The marker information is then provided to the client playback application (655) which may store the marker information as a data structure in memory for use during playback.

Although various processes for obtaining media content for use in providing playback of specific portions of media content in a trick-play mode using adaptive bitrate streaming is discussed above with reference to FIG. 6, one skilled in the art will recognize that other processes for obtaining media content may be performed in accordance with various embodiments of this invention.

Provision of Variable Speed Playback During a Trick-Play Mode

Figure 7:
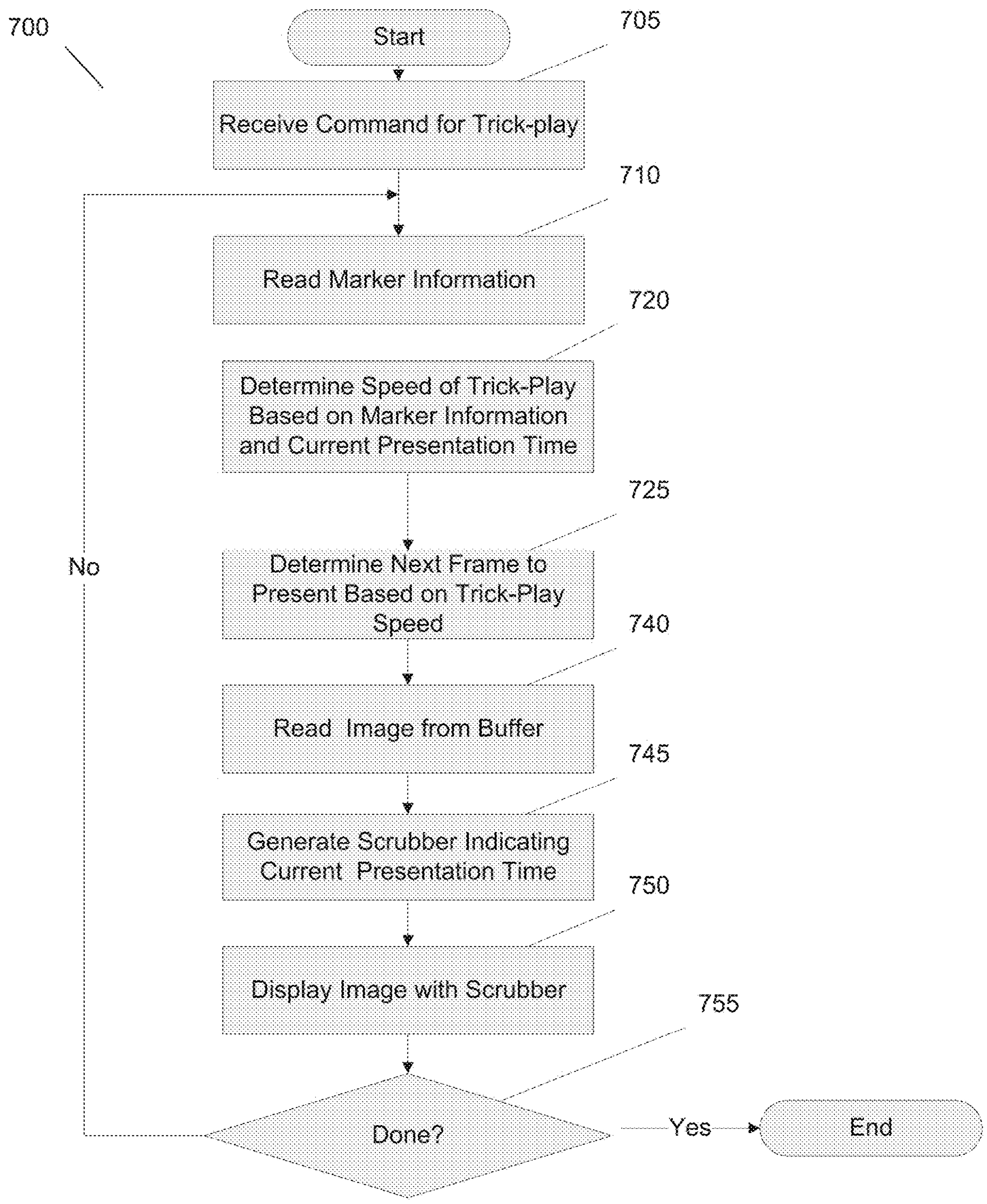
FIG. 7 illustrates a flow diagram for a process performed by a playback device to provide variable speed of a trick-play mode during playback of media content in accordance with an embodiment of the invention.

To allow a user to quickly find moments of interest in a media presentation, playback systems in accordance with some embodiments of this invention provide variable speed trick-play playback using marker information that indicates the presentation time of a moment of interest. For example, the media content of a sporting event may include a scoring play at a particular presentation time that a user may want to view. A user wants to use a trick-play, fast forward, to find the moment of interest. The user does not know the particular point at which she wants to see the playback and does not want to have to search through the entire content to find the moment of interest. As such, some playback systems may want to provide variable speed playback of the fast forward such that other parts of the media content are skipped over quickly to get to the moment of interest (the scoring play). A process performed by a playback device to provide variable speed trick-play playback in accordance with an embodiment of this invention is shown in FIG. 7.

In process 700, the playback device receives a request to present the media content in a trick-play mode (705). In accordance with some embodiments, trick-play modes can include, but are not limited to, fast forward, rewind, forward seek and backward seek. In accordance with many embodiments, the trick-play mode command is received as input via an Input/Output (I/O) device. Examples of I/O devices in accordance with various embodiments of this invention include, but are not limited to, a keyboard, a mouse, a touch screen, and the like.

The playback device reads the marker information from memory (710). In accordance with some embodiments of the invention, the marker information indicates the presentation times of moments of interest. In accordance with some embodiments, the marker information may include the presentation time of moments of interest in the media content. For example, in some embodiments where the media content is a sporting event, the marker may indicate a scoring play; a significant play such as a steal, catch, pass, or kick; and/or a stoppage in play. In accordance with some other embodiments, the marker information may indicate a presentation time in which the odds of a particular team/participant winning and/or scoring reach a specified percentage. In accordance with still some other embodiments, the marker information may indicate a time remaining of a game clock for the sporting event and/or stoppages of the game clock. In accordance with yet still some other embodiments, the marker information may include markers indicating a significant increase in social media activity where the increase of activity is often indicative of a moment of interest. In accordance with some embodiments, the user may be able to select the markers for a specific type of moment of interest. For example, the user may select one or more of the groups of markers for scoring plays, odd changes, social media activity or any other type of events that have markers to use in adjusting the speed of the playback in a trick-play mode.

The read marker information and the current presentation time are used to determine the speed of the trick-play playback (720). In accordance with some embodiments, the playback device determines whether the current presentation time is within a certain range of a marker. If the playback time is within a certain time range of the marker, the playback speed is decremented. For purposes of this discussion, the playback speed being decremented means that the playback speed for the trick-play is made to be slower than the trick-play playback speed during a normal implementation of the trick play. For example, a normal fast-forward playback is at four times normal playback speed and a decremented fast-forward speed is twice the normal playback speed. More particularly, playback is provided at a speed of thirty frames per second. During normal playback, each frame is shown at the 30 frame per second speed. In a fast forward mode, frames are still presented at a rate of 30 frame per second. However, the speed of the playback represents the number of frames in the presentation that are skipped between presented frames. Thus, 2× means that two frames are skipped between presented frames during playback and 4× means four frames are skipped during playback. As such, a decrement of speed means that the speed factor is divided by or subtracted by the speed component to obtain the new speed factor. For purposes of this discussion, incremented means that the playback speed for the trick-play is faster than the playback speed for a normal implementation of the trick-play. For example, if a fast-forward playback is at four times the speed of normal playback and incremented speed of the fast forward is eight times the speed of normal playback. Thus, based on the above explanation, an increment of speed means that speed factor (the 2 in 2× or 4 in 4×) is multiplied by or added to a speed component to obtain a new speed factor.

In accordance with a number of embodiments, the current presentation time may be in one of a number of time ranges from the presentation time of the next marker and each time range increments the playback speed by a differing amount. For example, a first range may be two minutes to four minutes from the presentation time of the next marker and a second range may be four to eight minutes from the next marker. The first range increments the speed of the trick-play playback by a multiplier such as (but not limited to) two and the second range increments the speed of the trick-play playback by a multiplier such as (but not limited to) four. For example, when the current presentation time is three minutes from the next marker and in the first range, the speed of the trick-play playback is multiplied such that a fast forward playback at two times the speed of normal playback is now four times the speed of normal playback. When the presentation time is 7 minutes from the next marker and in the second range, the speed of the trick-play playback is multiplied by four such that a fast forward playback at two times the normal speed of playback is now eight times the speed of normal playback. Although an example of two ranges is discussed, any number of ranges may be used and each time may encompass any time range without departing from these embodiments of the invention.

In a number of other embodiments, the playback speed is changed by simply moving playback to the next marker. In accordance with some of these embodiments, the current presentation time is moved to the presentation time of the next marker and playback in the trick-play mode continues much like a seek trick-play mode. Thus, the speed of the trick-play playback varies depending on the number of markers and the proximity of presentation times of the markers.

The playback device uses the speed of the trick-play playback to determine the next frame to present (725). In accordance with some embodiments, a speed multiplier may be applied to the normal playback speed of the trick-play to determine the next frame to present. In accordance with some other embodiments, the presentation of time of the next frame is determined based upon the current presentation time and the determined speed of the trick-play playback and the next frame is determined from presentation time information of the next frame. The next frame is then obtained from the buffer for presentation (740).

Optionally, the playback device may generate an image of a scrubber that indicates the current presentation time (745). In accordance with some embodiments, the scrubber indicates the current presentation with respect to a total presentation time for the media content. In accordance with many embodiments, a thumbnail or other image based on the image presented at the current presentation is shown associated with the current presentation time on the scrubber. The image of the scrubber may then be overlaid on the presented image(s) (750).

The process determines whether the trick-play playback is complete (755). If the trick-play playback is complete, the process 700 ends. Otherwise, process 700 is repeated to determine the next frame to present.

Although a process for providing variable speed trick-play playback in accordance with an embodiment of the invention is disclosed in FIG. 7, other processes may be performed by a playback device to provide variable speed trick-play playback in accordance with embodiments of the invention.

Process for Pre-Fetching Content Using Marker Information

As the content around interesting moments in the event is expected to be viewed at some point during playback, the marker information indicating the presentation time of the interesting moments can be used to obtain this content prior to playback to assure the content is already decoded prior to commencing playback. In accordance with some embodiments of the invention, the marker information is received and then used to pre-fetch segments of the content that are proximate the presentation time of an interesting moment. In accordance with some of these embodiments, a predetermined number of segments prior to the segment including the content for the presentation time of a marker are pre-fetched. In accordance with some other embodiments, a predetermined number of segments after the segment including the content for the presentation time of a marker are pre-fetched. In accordance with still some other embodiments, a predetermined number of segments prior to and after the segment including the content for the presentation time of a marker are pre-fetched. A process for pre-fetching segments of content based upon the marker information in accordance with an embodiment of the invention is shown in FIG. 8.

In process 800, the playback device obtains the marker information for the content (805). As described above in accordance with various embodiments, the marker information may be received in a manifest, as metadata for one or more segments, or requested as part of an index file referred to in the manifest. Marker information for a marker is then read from the marker information (810). The marker information is used to determine the presentation of a moment of interest in the content (820). The segment that includes the presentation time may then be determined (825).

A predetermined number of segments adjacent the segment associated with the presentation time are determined (840). In accordance with some of these embodiments, a predetermined number of segments prior to the segment including the content for the presentation time of a marker are determined. In accordance with some other embodiments, a predetermined number of segments after the segment including the content for the presentation time of a marker are determined. In accordance with still some other embodiments, a predetermined number of segments prior to and after the segment including the content for the presentation time of a marker are determined. In accordance with many of these embodiments, the type of moment noted by the marker determines the number and whether the segments are before and/or after the segment associated with the presentation time. The determined segments are obtained using adaptive bitrate streaming (850). One skilled in the art will note that methods other than adaptive bitrate streaming may be used to obtain the segments without departing from this invention. Process 800 is repeated for other moments indicated by markers in the marker information until a pre-defined event occurs (855). In accordance with some of these embodiments, pre-defined event may be a certain number of markers are handled and/or the end of the markers in the marker information is reached.

Figure 8:
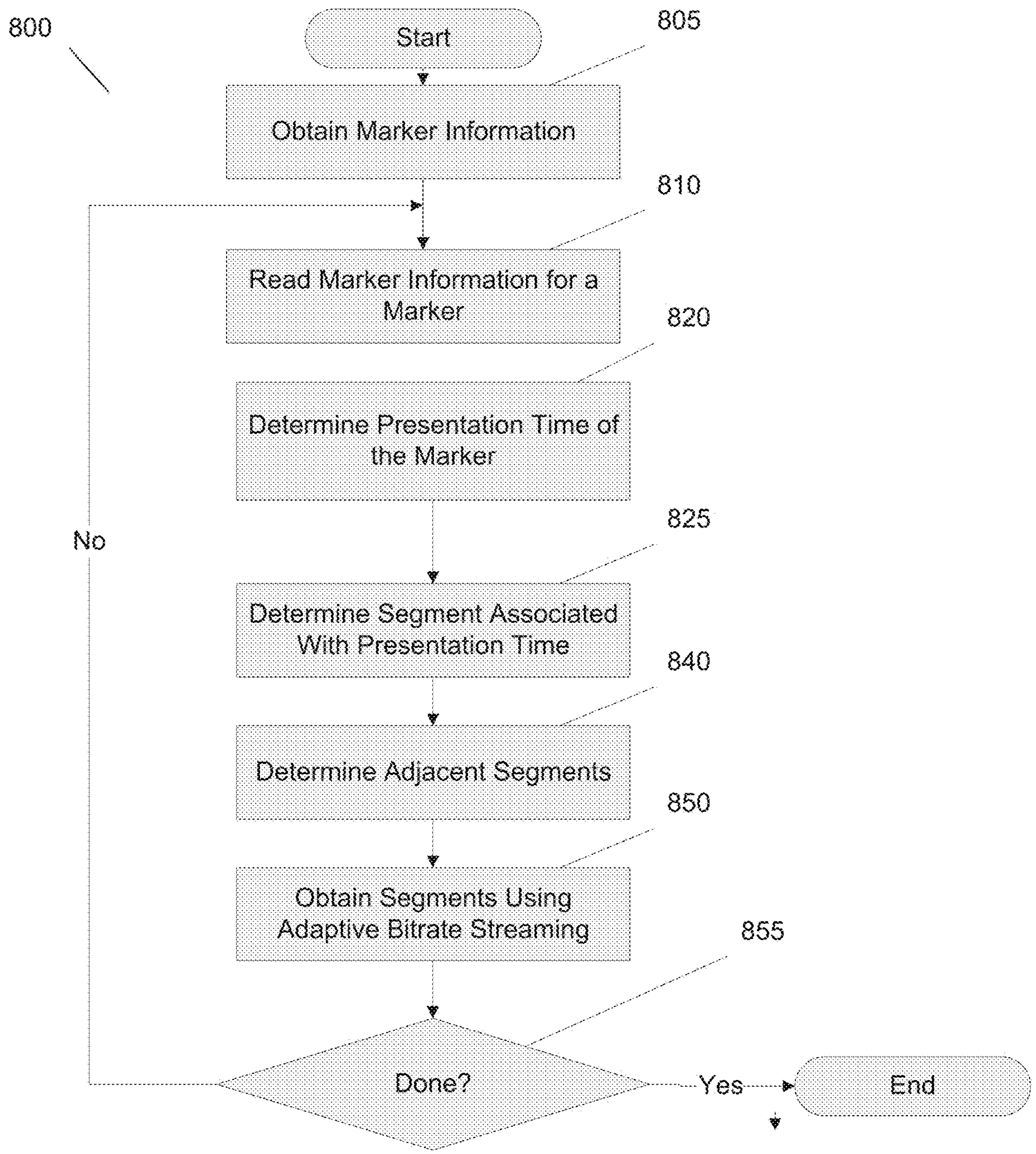
FIG. 8 illustrates a flow diagram for a process performed by a playback device to pre-fetch content using marker information in accordance with an embodiment of the invention.

Although a process for pre-fetching segments associated with a marker in accordance with an embodiment of the invention is disclosed in FIG. 8, other processes may be performed by a playback device to pack during a trick-play mode in accordance with embodiments of the invention.

Although the present invention has been described in certain specific aspects, many additional modifications and variations would be apparent to those skilled in the art. Specifically, this invention may be used in association with trick play tracks where only certain frames of the trick-play track are shown in accordance with some embodiments of the invention. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method for providing modified playback of media content to locations having marker information, the method comprising:

receiving a video content portion of media content by a playback device over a network using adaptive bitrate streaming, wherein receiving a video content portion of media content comprises:

receiving a top-level index in the playback device over a network, wherein the top-level index file identifies a plurality of alternative streams of the media content, wherein the top-level index comprises marker information that indicates a presentation time for each of one or more moments of interest in the media content;

selecting an alternative stream of the plurality of alternative streams of the media content based upon streaming conditions using the playback device;

requesting and receiving portions of the media content of the selected alternative stream using the playback device; and decoding a plurality of frames of the video content in the playback device from the portions of media content received by the playback device;

commencing playback of the received portions of media content from the selected alternative stream in the playback device;

receiving a seek command for modifying playback of the media content in the playback device, wherein the seek command modifies a current presentation time;

reading a presentation time of a next marker from the marker information using the playback device;

moving the current presentation time to the presentation time of the next marker using the playback device;

presenting media content of the moment of interest associated with the next marker using the playback device;

determining, using the playback device, a next frame to present from the plurality of frames based upon the modified presentation time caused by the seek command;

moving the current presentation time to the modified presentation time caused by the seek command using the playback device; and presenting the determined next frame using the playback device.

2. The method of claim 1, wherein the seek command modifies the current presentation time to a presentation time after the presentation time of the next marker.

3. The method of claim 1, further comprising:

generating a display of a scrubber indicating the current presentation time using the playback device; and overlaying the display of the scrubber over the presentation of an image on the display.

4. The method of claim 1, wherein receiving marker information comprises:

reading a pointer to a file including the marker information from the top-level index file using the playback device;

requesting the file from content provider system using the playback device; and receiving the file in the playback device in response to the requesting.

5. The method of claim 1, wherein the determining of the next frame comprises setting a next presentation time to be the presentation time of the next marker and using one of the plurality of frames associated with the next presentation time as the next frame.

6. The method of claim 1, wherein the determining of the next frame comprises:

determining whether the current presentation time is within one of a plurality of ranges from the presentation time of the next marker; and adjusting a playback speed for trick-play based upon which one of the plurality of ranges current presentation time is determined to be within.

7. The method of claim 6, wherein a playback speed of trick-play is decremented in response to being within a certain range.

8. The method of claim 6, wherein a playback speed of trick-play is incremented in response to being outside a certain range.

9. A playback device comprising:

a memory;

a network interface; and a processor that reads instructions stored in the memory that direct the processor to:

receive a video content portion of media content over a network using adaptive bitrate streaming, wherein receiving a video content portion of media content comprises:

receive a top-level index in the playback device over a network, wherein the top-level index file identifies a plurality of alternative streams of the media content, wherein the top-level index comprises marker information that indicates a presentation time for each of one or more moments of interest in the media content;

select an alternative stream of the plurality of alternative streams of the media content based upon streaming conditions using the playback device;

request and receiving portions of the media content of the selected alternative stream using the playback device; and decode a plurality of frames of the video content in the playback device from the portions of media content received by the playback device;

commence playback of the received portions of media content from the selected alternative stream in the playback device;

receive a seek command for modifying playback of the media content in the playback device, wherein the seek command modifies a current presentation time;

read a presentation time of a next marker from the marker information using the playback device;

move the current presentation time to the presentation time of the next marker using the playback device;

present media content of the moment of interest associated with the next marker using the playback device;

determine, using the playback device, a next frame to present from the plurality of frames based upon the modified presentation time caused by the seek command;

move the current presentation time to the modified presentation time caused by the seek command using the playback device; and present the determined next frame using the playback device.

10. The playback device of claim 9, wherein the seek command modifies the current presentation time to a presentation time after the presentation time of the next marker.

11. The playback device of claim 9, wherein the processor is further directed to:

generate a display of a scrubber indicating the current presentation time using the playback device; and overlay the display of the scrubber over the presentation of an image on the display.

12. The playback device of claim 9, wherein receiving marker information comprises:

reading a pointer to a file including the marker information from the top-level index file using the playback device;

requesting the file from content provider system using the playback device; and receiving the file in the playback device in response to the requesting.

13. The playback device of claim 9, wherein the determining of the next frame comprises setting a next presentation time to be the presentation time of the next marker and using one of the plurality of frames associated with the next presentation time as the next frame.

14. The playback device of claim 9, wherein the determining of the next frame comprises:

determining whether the current presentation time is within one of a plurality of ranges from the presentation time of the next marker; and adjusting a playback speed for trick-play based upon which one of the plurality of ranges current presentation time is determined to be within.

15. The playback device of claim 14, wherein a playback speed of trick-play is decremented in response to being within a certain range.

16. The playback device of claim 14, wherein a playback speed of trick-play is incremented in response to being outside a certain range.

17. A method for providing modified playback of media content to locations having marker information, the method comprising:

receiving a video content portion of media content by a playback device over a network using adaptive bitrate streaming, wherein receiving a video content portion of media content comprises:

receiving a top-level index in the playback device over a network, wherein the top-level index file identifies a plurality of alternative streams of the media content, wherein the top-level index comprises marker information that indicates a presentation time for each of one or more moments of interest in the media content;

selecting an alternative stream of the plurality of alternative streams of the media content based upon streaming conditions using the playback device;

requesting and receiving portions of the media content of the selected alternative stream using the playback device; and decoding a plurality of frames of the video content in the playback device from the portions of media content received by the playback device;

commencing playback of the received portions of media content from the selected alternative stream in the playback device;

receiving a seek command for modifying playback of the media content in the playback device, wherein the seek command modifies a current presentation time to a presentation time after the presentation time of a next marker;

reading a presentation time of the next marker from the marker information using the playback device;

moving the current presentation time to the presentation time of the next marker using the playback device;

presenting media content of the moment of interest associated with the next marker using the playback device;

determining, using the playback device, a next frame to present from the plurality of frames based upon the modified presentation time caused by the seek command;

moving the current presentation time to the modified presentation time caused by the seek command using the playback device; and presenting the determined next frame using the playback device.

* * * * *